(12) United States Patent
Lim et al.

(10) Patent No.: US 11,972,632 B1
(45) Date of Patent: Apr. 30, 2024

(54) APPARATUS AND METHOD OF DIGITAL ENHANCEMENT OF FINGERPRINT RIDGES

(71) Applicant: REPUBLIC OF KOREA (NATIONAL FORENSIC SERVICE DIRECTOR MINISTRY OF THE INTERIOR AND SAFETY), Wonju-si (KR)

(72) Inventors: Kyu Young Lim, Wonju-si (KR); Young Il Seo, Wonju-si (KR); Byung Seon Moon, Busan (KR); Jin Pyo Kim, Daejeon (KR)

(73) Assignee: REPUBLIC OF KOREA (NATIONAL SERVICE DIRECTOR MINISTRY OF THE INTERIOR AND SAFETY), Wonju-si (KR)

( * ) Notice: Subject to any disclaimer, the term of this patent is extended or adjusted under 35 U.S.C. 154(b) by 0 days.

(21) Appl. No.: 18/210,841

(22) Filed: Jun. 16, 2023

(30) Foreign Application Priority Data

Mar. 31, 2023 (KR) .......................... 10-2023-0042907

(51) Int. Cl.
*G06V 40/12* (2022.01)
*G06V 10/75* (2022.01)

(52) U.S. Cl.
CPC ........ *G06V 40/1359* (2022.01); *G06V 10/751* (2022.01)

(58) Field of Classification Search
CPC .. G06V 40/1359; G06V 10/751; G06V 10/30; G06V 10/54; G06V 40/1347; G06V 40/1376; G06V 40/1318; G06V 40/1365; G06F 21/32; G06F 21/604; G06F 21/6209; G06T 5/70; G06T 5/80; G06T 5/90; G06T 7/194; G06T 2207/30196; G06T 2207/20024; H04L 63/0861

See application file for complete search history.

(56) References Cited

U.S. PATENT DOCUMENTS

2019/0266377 A1\* 8/2019 Maurer .................... G06T 7/149
2022/0084319 A1\* 3/2022 Zhu ..................... H04L 63/0861

\* cited by examiner

*Primary Examiner* — Abhishek Sarma
(74) *Attorney, Agent, or Firm* — Hauptman Ham, LLP

(57) ABSTRACT

A fingerprint ridge digital enhancement apparatus includes: a fingerprint image obtainer configured to obtain a fingerprint image; a pixel value extractor configured to divide an area with ridges and an area without ridges in the fingerprint image, and to extract a pixel value according to a color model for each area; an outlier detector configured to detect an outlier of the pixel value according to the color model for each area; a correction operator configured to calculate the average and standard deviation of pixel values according to the color model for each area from which the outlier is removed; a parameter operator configured to set a parameter that is a criterion for dividing each area, and to operate a reference value of the parameter; and a matrix operator configured to generate and operate a matrix including the pixel value according to the color model of the fingerprint image and the reference value of the parameter.

5 Claims, 12 Drawing Sheets
(8 of 12 Drawing Sheet(s) Filed in Color)

| FINGERPRINT IMAGE | PORTION OF AREA WITH RIDGES | PORTION OF AREA WITHOUT RIDGES |
|---|---|---|
|  |  |  |

| COLOR | RED (R) | GREEN (G) | BLUE (B) | HUER (H) | SATURATION (S) | VALUE (V) |
|---|---|---|---|---|---|---|
|  | 138 | 67 | 107 | 163 | 83 | 96 |
|  | 216 | 73 | 127 | 169 | 155 | 136 |
|  | 243 | 49 | 119 | 170 | 214 | 137 |
|  | 253 | 98 | 155 | 169 | 234 | 165 |
|  | 251 | 151 | 187 | 170 | 222 | 189 |
|  | 246 | 3 | 21 | 178 | 234 | 117 |
|  | 253 | 23 | 61 | 175 | 236 | 130 |
|  | 255 | 112 | 148 | 173 | 240 | 173 |
| AVERAGE | 232 | 72 | 116 | 171 | 202 | 143 |
| STANDARD DEVIATION | 40 | 48 | 53 | 5 | 55 | 31 |

FIG. 7

| COLOR | RED (R) | GREEN (G) | BLUE (B) | HUE R (H) | SATURATION (S) | VALUE (V) |
|---|---|---|---|---|---|---|
| | 219 | 225 | 239 | 111 | 92 | 216 |
| | 97 | 81 | 107 | 139 | 33 | 88 |
| | 127 | 118 | 121 | 170 | 9 | 115 |
| | 236 | 241 | 235 | 55 | 42 | 224 |
| | 245 | 249 | 248 | 83 | 60 | 232 |
| | 222 | 226 | 225 | 83 | 15 | 211 |
| | 0 | 0 | 4 | 120 | 240 | 2 |
| | 129 | 125 | 122 | 13 | 7 | 118 |
| | 146 | 137 | 130 | 13 | 16 | 130 |
| | 75 | 84 | 99 | 109 | 33 | 82 |
| | 123 | 119 | 120 | 173 | 4 | 114 |
| | 57 | 40 | 82 | 132 | 83 | 57 |
| | 94 | 76 | 128 | 131 | 61 | 96 |
| | 134 | 142 | 127 | 46 | 15 | 127 |
| | 212 | 217 | 187 | 35 | 68 | 190 |
| | 163 | 102 | 107 | 178 | 60 | 125 |
| | 22 | 11 | 67 | 126 | 172 | 37 |
| | 235 | 239 | 238 | 83 | 27 | 223 |
| AVERAGE | 141 | 135 | 144 | 100 | 58 | 133 |
| STANDARD DEVIATION | 76 | 81 | 69 | 52 | 61 | 69 |

FIG. 8

| COLOR | R | z(R) | G | z(G) | B | z(B) | H | z(H) | S | z(S) | V | z(V) |
|---|---|---|---|---|---|---|---|---|---|---|---|---|
| | 138 | -2.35 | 67 | -0.10 | 107 | -0.16 | 163 | -1.74 | 83 | -2.15 | 96 | -1.52 |
| | 216 | -0.40 | 73 | 0.02 | 127 | 0.21 | 169 | -0.42 | 155 | -0.85 | 136 | -0.22 |
| | 243 | 0.28 | 49 | -0.48 | 119 | 0.06 | 170 | -0.19 | 214 | 0.21 | 137 | -0.19 |
| | 253 | 0.53 | 98 | 0.54 | 155 | 0.74 | 169 | -0.42 | 234 | 0.57 | 165 | 0.72 |
| | 251 | 0.48 | 151 | 1.64 | 187 | 1.34 | 170 | -0.19 | 222 | 0.36 | 189 | 1.50 |
| | 246 | 0.35 | 3 | -1.43 | 21 | -1.78 | 178 | 1.58 | 234 | 0.57 | 117 | -0.84 |
| | 253 | 0.53 | 23 | -1.02 | 61 | -1.03 | 175 | 0.91 | 236 | 0.61 | 130 | -0.42 |
| | 255 | 0.58 | 112 | 0.83 | 148 | 0.61 | 173 | 0.47 | 240 | 0.68 | 173 | 0.98 |

FIG. 9

| COLOR | R | z(R) | G | z(G) | B | z(B) | H | z(H) | S | z(S) | V | z(V) |
|---|---|---|---|---|---|---|---|---|---|---|---|---|
|  | 219 | 1.03 | 225 | 1.11 | 239 | 1.37 | 111 | 0.21 | 92 | 0.56 | 216 | 1.20 |
|  | 97 | -0.58 | 81 | -0.67 | 107 | -0.53 | 139 | 0.75 | 33 | -0.40 | 88 | -0.64 |
|  | 127 | -0.18 | 118 | -0.21 | 121 | -0.33 | 170 | 1.34 | 9 | -0.79 | 115 | -0.25 |
|  | 236 | 1.26 | 241 | 1.31 | 235 | 1.32 | 55 | -0.86 | 42 | -0.25 | 224 | 1.32 |
|  | 245 | 1.38 | 249 | 1.41 | 248 | 1.50 | 83 | -0.33 | 60 | 0.04 | 232 | 1.43 |
|  | 222 | 1.07 | 226 | 1.12 | 225 | 1.17 | 83 | -0.33 | 15 | -0.70 | 211 | 1.13 |
|  | 0 | -1.86 | 0 | -1.67 | 4 | -2.01 | 120 | 0.38 | 240 | 2.98 | 2 | -1.89 |
|  | 129 | -0.16 | 125 | -0.12 | 122 | -0.31 | 13 | -1.67 | 7 | -0.83 | 118 | -0.21 |
|  | 146 | 0.07 | 137 | 0.02 | 130 | -0.20 | 13 | -1.67 | 16 | -0.68 | 130 | -0.04 |
|  | 75 | -0.87 | 84 | -0.53 | 99 | -0.64 | 109 | 0.17 | 33 | -0.40 | 82 | -0.73 |
|  | 123 | -0.24 | 119 | -0.20 | 120 | -0.34 | 173 | 1.40 | 4 | -0.87 | 114 | -0.27 |
|  | 57 | -1.11 | 40 | -1.17 | 82 | -0.89 | 132 | 0.61 | 83 | 0.41 | 57 | -1.09 |
|  | 94 | -0.62 | 76 | -0.73 | 128 | -0.23 | 131 | 0.59 | 61 | 0.06 | 96 | -0.53 |
|  | 134 | -0.09 | 142 | 0.09 | 127 | -0.24 | 46 | -1.04 | 15 | -0.70 | 127 | -0.08 |
|  | 212 | 0.94 | 217 | 1.01 | 187 | 0.62 | 35 | -1.25 | 68 | 0.17 | 190 | 0.83 |
|  | 163 | 0.29 | 102 | -0.41 | 107 | -0.53 | 178 | 1.50 | 60 | 0.04 | 125 | -0.11 |
|  | 22 | -1.57 | 11 | -1.53 | 67 | -1.11 | 126 | 0.50 | 172 | 1.87 | 37 | -1.38 |
|  | 235 | 1.24 | 239 | 1.28 | 238 | 1.36 | 83 | -0.33 | 27 | -0.50 | 223 | 1.30 |

| COLOR | R | G | B | H | S | V |
|---|---|---|---|---|---|---|
|  |  | 67 | 107 |  |  |  |
|  | 216 | 73 | 127 | 169 | 155 | 136 |
|  | 243 | 49 | 119 | 170 | 214 | 137 |
|  | 253 | 98 | 155 | 169 | 234 | 165 |
|  | 251 |  | 187 | 170 | 222 |  |
|  | 246 |  |  |  | 234 | 117 |
|  | 253 |  |  | 175 | 236 | 130 |
|  | 255 | 112 |  | 173 | 240 | 173 |
| AVERAGE | 245 | 80 | 131 | 171 | 219 | 136 |
| STANDARD DEVIATION | 14 | 25 | 20 | 2 | 30 | 26 |

FIG. 11

| COLOR | R | G | B | H | S | V |
|---|---|---|---|---|---|---|
|  |  |  |  | 111 | 92 |  |
|  | 97 | 81 | 107 | 139 | 33 | 88 |
|  | 127 | 118 | 121 |  | 9 | 115 |
|  |  |  |  | 55 | 42 |  |
|  |  |  |  | 83 | 60 |  |
|  |  |  |  | 83 | 15 |  |
|  |  |  |  | 120 |  |  |
|  | 129 | 125 | 122 |  | 7 | 118 |
|  | 146 | 137 | 130 |  | 16 | 130 |
|  | 75 | 84 | 99 | 109 | 33 | 82 |
|  | 123 | 119 | 120 |  | 4 | 114 |
|  |  |  | 82 | 132 | 83 |  |
|  | 94 | 76 | 128 | 131 | 61 | 96 |
|  | 134 | 142 | 127 |  | 15 | 127 |
|  | 212 |  | 187 |  | 68 | 190 |
|  | 163 | 102 | 107 |  | 60 | 125 |
|  |  |  |  | 126 |  |  |
|  |  |  |  | 83 | 27 |  |
| AVERAGE | 130 | 109 | 121 | 107 | 40 | 119 |
| STANDARD DEVIATION | 39 | 25 | 26 | 27 | 29 | 30 |

APPARATUS AND METHOD OF DIGITAL ENHANCEMENT OF FINGERPRINT RIDGES

CROSS-REFERENCE TO RELATED APPLICATIONS

The present application is based on and claims priority to Korean Patent Application No. 10-2023-0042907 filed on Mar. 31, 2023, in the Korean Intellectual Property Office, which is incorporated herein by reference in its entirety.

BACKGROUND

1. Field

One or more embodiments relate to an apparatus and a method of digital enhancement of fingerprint ridges.

2. Description of the Related Art

A fingerprint refers to the pattern of the skin on the inside of the tip of a person's finger or the trace it leaves. In criminal cases, fingerprint analysis plays an important role in solving crimes by estimating a suspect and reconstructing a crime scene.

A fingerprint may largely include a ridge, which is a line in which the entrance of a sweat gland in the skin of a fingertip is raised, and a valley, which is a depression between ridges.

Ridges of a fingerprint remaining on an object (paper, plastic, metal, etc.) are expressed darker than valleys. The ridges of the fingerprint are expressed clearly or blurry, and the clarity is distinguished. When the ridges of the fingerprint remaining on the object are blurry and unclear, it is difficult to determine the shape of the ridges. In addition, there is a slight difference in color between a portion where the ridges of the fingerprint appears in the object and a portion where the ridges of the fingerprint do not appear.

Therefore, a method of enhancing the shape of a ridge by dividing an area with ridges and an area without ridges with a color difference in a fingerprint image may be studied.

SUMMARY

One or more embodiments include an apparatus and a method of digital enhancement of fingerprint ridges. In more detail, in a fingerprint image, a pixel value according to a color model is extracted by dividing an area with ridges and an area without ridges, and digital enhancement of fingerprint ridges is performed by setting parameters necessary for dividing areas according to the distribution of the pixel value according to a color model.

One or more embodiments contribute to appropriate resolution of criminal cases by more clearly expressing the shape of a ridge in a fingerprint image.

One or more embodiments provide an apparatus and a method of reducing processing time by performing matrix-based operations instead of pixel-based operations during fingerprint ridge enhancement operations.

According to one or more embodiments, a fingerprint ridge digital enhancement apparatus includes: a fingerprint image obtainer configured to obtain a fingerprint image; a pixel value extractor configured to divide an area with ridges and an area without ridges in the fingerprint image, and to extract a pixel value according to a color model for each area; an outlier detector configured to detect an outlier of the pixel value according to the color model for each area; a correction operator configured to operate an average and standard deviation of pixel values according to the color model for each area from which the outlier is removed; a parameter operator configured to set a parameter that is a criterion for dividing each area, and to operate a reference value of the parameter; and a matrix operator configured to generate and operate a matrix including the pixel value according to the color model of the fingerprint image and the reference value of the parameter.

In an embodiment, the color model may include an RGB model and an HSV model.

In an embodiment, the outlier detector may calculate a Z-score of a pixel value according to the color model for each area, and may determine and detect a Z-score of a certain range as an outlier.

According to one or more embodiments, a fingerprint ridge digital enhancement method includes: obtaining a fingerprint image; dividing an area with ridges and an area without ridges in the fingerprint image, and extracting a pixel value according to a color model for each area; detecting an outlier of the pixel value according to the color model for each area; calculating an average and standard deviation of pixel values according to the color model for each area from which the outlier is removed; setting a parameter that is a criterion for dividing each area, and operating a reference value of the parameter; and generating and operating a matrix including the pixel value according to the color model of the fingerprint image and the reference value of the parameter.

In an embodiment, the generating and operating of the matrix may include generating a matrix M1 (fingerprint image matrix) including the pixel value according to the color model of the fingerprint image; generating a matrix M2 (reference value matrix) including the reference value of the parameter; generating an operation matrix X by performing operation based on the fingerprint image matrix M1 and the reference value matrix M2; integer processing a component of the operation matrix X; calculating a discriminant value by performing operation based on parameter-related components of the operation matrix X; and enhancing a ridge of the fingerprint image with a specific color by performing operation based on the discrimination value and a pixel value of the specific color.

A non-transitory computer-readable recording medium for recording a computer program for executing a fingerprint ridge digital enhancement method according to an embodiment is provided.

Additional aspects will be set forth in part in the description which follows and, in part, will be apparent from the description, or may be learned by practice of the presented embodiments.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

These and/or other aspects will become apparent and more readily appreciated from the following description of the embodiments, taken in conjunction with the accompanying drawings in which:

FIG. 7 is a table showing pixel values of colors constituting an area without ridges in the fingerprint image of FIG. 3;

FIG. 8 is a table for calculating Z-scores of the pixel values of FIG. 6;

FIG. 9 is a table for calculating Z-scores of the pixel values of FIG. 7;

FIG. 11 is a table showing averages and standard deviations calculated after removing outliers from the pixel values of FIG. 7.

DETAILED DESCRIPTION

Figure 1:
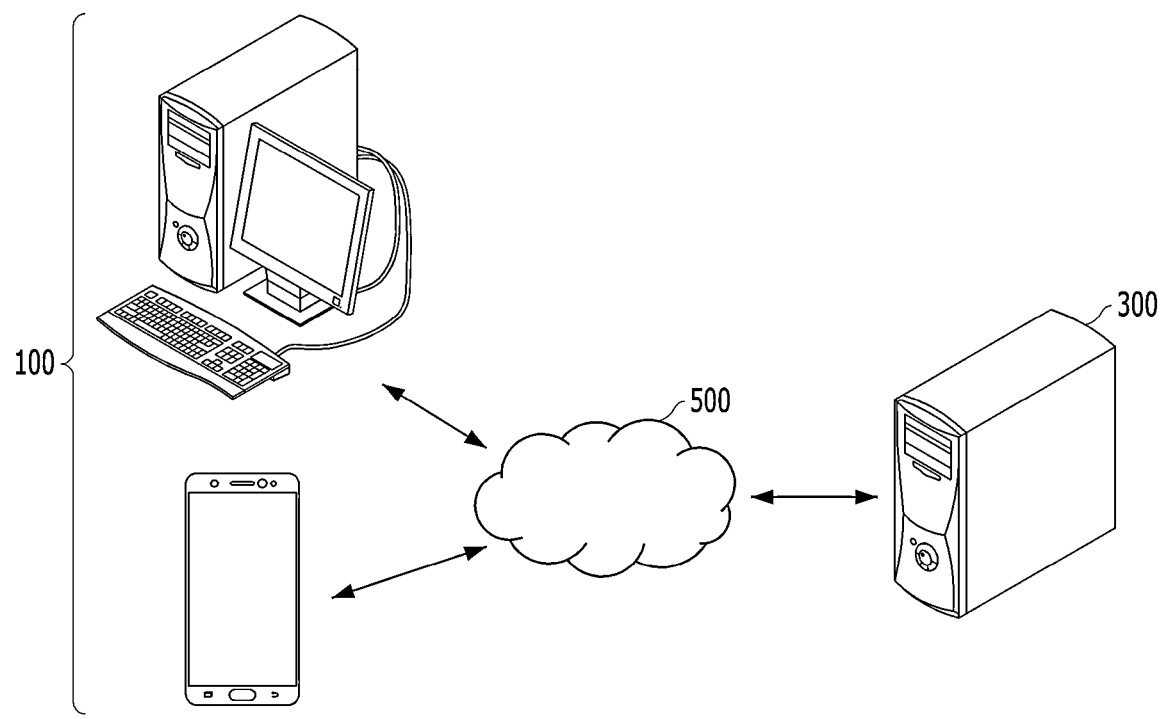
FIG. 1 is a schematic view of a fingerprint ridge digital enhancement system according to an embodiment.

Hereinafter, embodiments will be described in detail with reference to the accompanying drawings. The same reference numerals are used to denote the same elements, and repeated descriptions thereof will be omitted.

It will be understood that although the terms "first," "second," etc. may be used herein to describe various components, these components should not be limited by these terms.

An expression used in the singular encompasses the expression of the plural, unless it has a clearly different meaning in the context.

It will be further understood that the terms "comprises" and/or "comprising" used herein specify the presence of stated features or components, but do not preclude the presence or addition of one or more other features or components.

It will be understood that when a layer, region, or component is referred to as being "formed on" another layer, region, or component, it can be directly or indirectly formed on the other layer, region, or component. That is, for example, intervening layers, regions, or components may be present.

Sizes of elements in the drawings may be exaggerated for convenience of explanation. In other words, since sizes and thicknesses of components in the drawings are arbitrarily illustrated for convenience of description, the following embodiments are not limited thereto. When a certain embodiment may be implemented differently, a specific process order may be performed differently from the described order. For example, two consecutively described processes may be performed substantially at the same time or performed in an order opposite to the described order.

FIG. 1 is a schematic view of a fingerprint ridge digital enhancement system according to an embodiment;

Referring to FIG. 1, the fingerprint ridge digital enhancement system according to an embodiment may include a fingerprint ridge digital enhancement apparatus 100, a server 300, and a network 500 connecting them.

The fingerprint ridge digital enhancement system according to an embodiment provides a digital enhancement service for fingerprint ridges. In more detail, the fingerprint ridge digital enhancement system provided according to an embodiment may upload data obtained by a fingerprint ridge digital enhancement method 200 (of FIG. 4) that a user experiments, and may share the uploaded data with other users. For example, a user may upload data about a fingerprint image obtained at a specific crime scene. When a user uploads data, the fingerprint ridge digital enhancement system according to an embodiment registers the data in the server 300 and may provide an interface through which other users may inquire the data registered in the server 300.

The fingerprint ridge digital enhancement apparatus 100 may be connected to the server 300 through the network 500. The fingerprint ridge digital enhancement apparatus 100 to which the disclosure is applied may be various types of information processing devices used by a user, for example, a personal computer (PC), a laptop computer, a mobile phone, a tablet PC, a smart phone, a personal digital assistant (PDA), or the like. However, these are only examples, and in addition to the above-described examples, the fingerprint ridge digital enhancement apparatus 100 needs to be interpreted as a concept including all devices capable of communication that are currently developed and commercialized or to be developed in the future. The fingerprint ridge digital enhancement apparatus 100 may be borrowed without limitation as long as an application for which the fingerprint ridge digital enhancement method 200 is programmed can be loaded.

The network 500 connects the fingerprint ridge digital enhancement apparatus 100 to the server 300. For example, the network 500 provides a connection path such that the fingerprint ridge digital enhancement apparatus 100 may transmit and receive packet data after accessing the server 300.

Although not shown in the drawings, the server 300 according to an embodiment may include a memory, an input/output unit, a program storage unit, a control unit, and the like.

Figure 2:
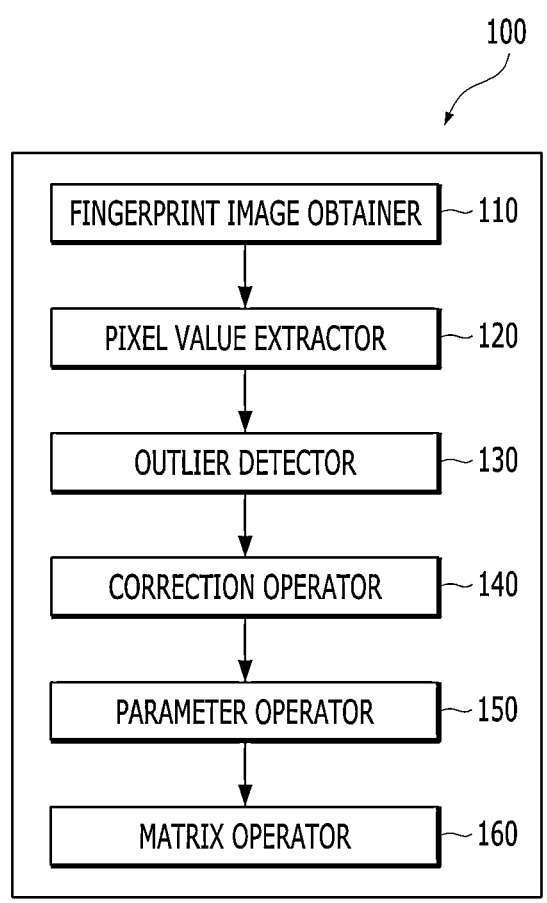
FIG. 2 is a schematic block diagram of a fingerprint ridge digital enhancement apparatus of FIG. 1.

FIG. 2 is a schematic block diagram of the fingerprint ridge digital enhancement apparatus 100 of FIG. 1.

The fingerprint ridge digital enhancement apparatus 100 according to an embodiment may correspond to at least one processor or may include at least one processor. Accordingly, the fingerprint ridge digital enhancement apparatus 100 may be driven in a form included in a hardware device such as a microprocessor or a general-purpose computer system.

The fingerprint ridge digital enhancement apparatus 100 in FIG. 2 shows only components related to the present embodiment in order to avoid obscuring features of the present embodiment. Accordingly, it is to be understood by one of ordinary skill in the art that other general-purpose components may be further included in addition to the components shown in FIG. 2.

Referring to FIG. 2, the fingerprint ridge digital enhancement apparatus 100 according to an embodiment may include a fingerprint image obtainer 110, a pixel value extractor 120, an outlier detector 130, a correction operator 140, a parameter operator 150, and a matrix operator 160.

The fingerprint image obtainer 110 may obtain a fingerprint image.

The fingerprint image obtainer 110 may obtain an image by directly photographing a fingerprint left on an object. In addition, the fingerprint image obtainer 110 may receive an image from another imaging device or the server 300.

For example, the fingerprint image obtainer 110 may include a camera including a lens and an image sensor. The image sensor may convert an image input by a lens into an electrical signal, and may be a semiconductor device such as a charge-coupled device (CCD) or a complementary metal oxide semiconductor (CMOS).

In this case, the fingerprint image may be an image of a fingerprint left on an object. In addition, the fingerprint image may be a fingerprint image developed by applying a reagent or the like according to a fingerprint development technique.

Figure 3:
FIG. 3 is an exemplary view of a portion of an area with ridges and an area without ridges in a fingerprint image.
Figure 3:
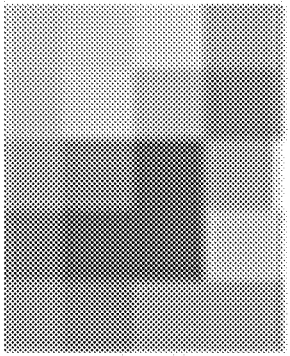
Figure 3:
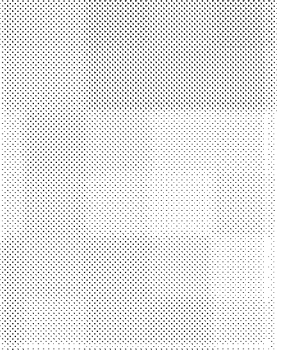

FIG. 3 is an exemplary view of a portion of an area with ridges and an area without ridges in a fingerprint image. A fingerprint image obtained by the fingerprint image obtainer 110 may be composed of pixels.

The pixel value extractor 120 may divide an area with ridges and an area without ridges in the fingerprint image, and may extract a pixel value according to a color model for each area.

The fingerprint image may be divided into an area with ridges and an area without ridges. Each color constituting the area with ridges and the area without ridges has a slight difference.

For example, a color model applied by the pixel value extractor 120 may include an RGB, HSV, Gray, or YCbCr model.

The RGB model is the most basic color model and is a model that expresses color as a combination of three components of red, green, and blue. The HSV model is a model that expresses color with three components: Hue, Saturation, and Value. The gray model is a model that expresses color only with intensity information without using color information. In addition, the YCbCr model is a model that separates an intensity component (Y) and color difference information (Cb and Cr) from RGB colors.

A color model applied by the pixel value extractor 120 may be selected considering characteristics of colors constituting the fingerprint image. For example, the pixel value extractor 120 may apply the RGB model and the HSV model.

The outlier detector 130 may detect an outlier of a pixel value according to a color model for each area.

An outlier means a value out of a normal range of observed data. Accurate analysis cannot be performed when collected data excessively deviate from a specific range. Therefore, analysis needs to be performed after detecting and removing outliers from the collected data. A method of detecting outliers in the collected data may be performed in various ways that can be considered by one of ordinary skill in the art.

For example, outliers may be detected for each color component value from among pixel values according to the color model for each area.

In addition, Z-scores may be used as outliers, and Z-scores of pixel values according to a color model for each area may be calculated, and Z-scores of a certain range may be determined as outliers to be detected.

The correction operator 140 may calculate an average and a standard deviation of pixel values according to a color model for each area from which an outlier is removed.

The average is a mathematical measure of the central tendency of collected data. An arithmetic mean is a simple average obtained by dividing the total sum of data by the number of data.

The standard deviation is a value that shows the spread of data, and is a number that indicates how far the data is from the average (center value). The standard deviation is defined as a positive square root of the variance, and the variance is the average of squared deviations (measured value minus average).

The average and the standard deviation are representative values that represent the distribution of data, and are values that may most effectively represent characteristics of a group of interest.

Accordingly, a distribution tendency of pixel values may be identified by calculating an average and a standard deviation of pixel values according to a color model for each area.

The parameter operator 150 may set a parameter for dividing an area with ridges and an area without ridges in the fingerprint image, and may operate a reference value of the parameter.

The parameter operator 150 may determine a parameter for dividing an area with ridges and an area without ridges and a reference value of the parameter through an operation result of the correction operator 140.

As an embodiment, the parameter may be set among individual color components of a color model applied to the fingerprint image, and the reference value of the parameter may be calculated as pixel values of the individual color components of the applied color model.

For example, when the color models applied to the fingerprint image are the RGB and HSV models, a parameter may be set among individual color components R, G, B, H, S, and V, and a reference value may be operated with pixel values (R value, G value, B value, H value, S value, and V value) of the set parameter.

The matrix operator 160 may generate and operate a matrix including pixel values according to a color model for each area and a reference value of a parameter.

In order to enhance a ridge in the fingerprint image, processing time may be reduced by performing matrix-based operation rather than performing pixel-based operation.

In addition, the fingerprint ridge digital enhancement apparatus 100 may include a communication unit, a storage unit, a display unit, an input unit, and the like.

The communication unit may provide an interface for communication with other systems or devices, and the storage unit may store data such as a basic program, an application program, and setting information for the operation of the fingerprint ridge digital enhancement apparatus 100. The display unit may perform functions for outputting information in the form of numbers, characters, images, graphics, and the like. The input unit may detect an input from the outside (e.g., a user) and provide data corresponding to the input to the processor.

A more detailed description of the fingerprint ridge digital enhancement apparatus 100 according to an embodiment will be described below with reference to FIGS. 4 to 12.

Hereinafter, the fingerprint ridge digital enhancement method 200 according to an embodiment will be described with reference to FIGS. 4 to 12.

Figure 4:
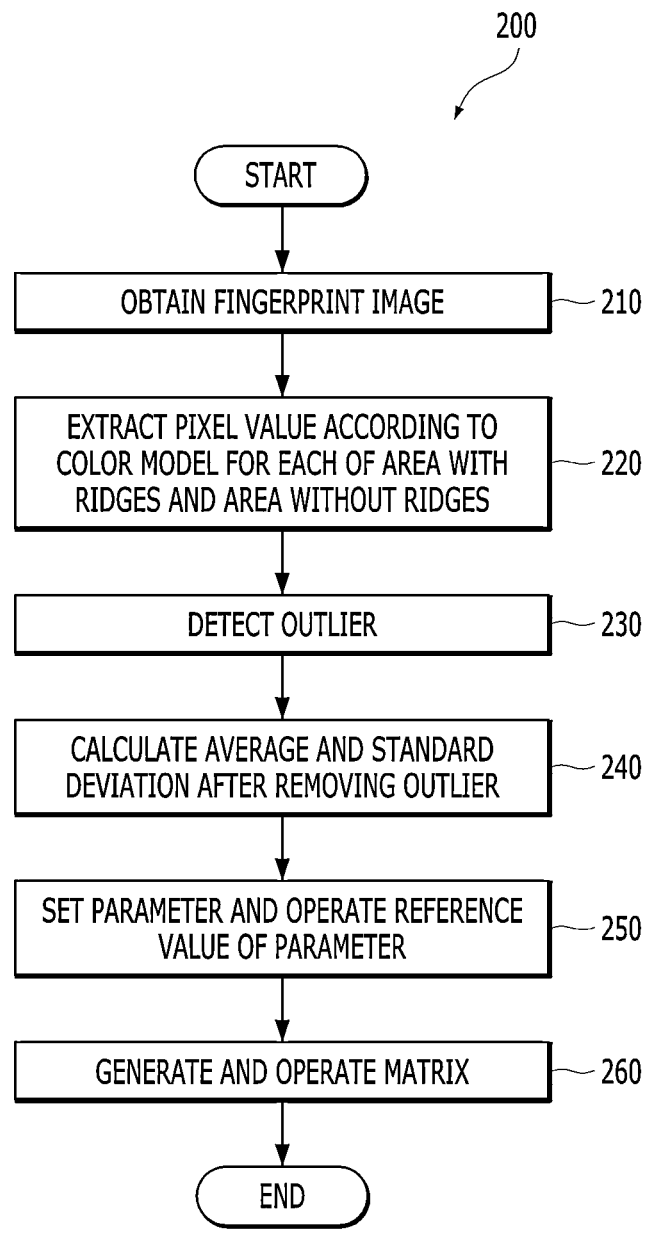
FIGS. 4 and 5 are flowcharts schematically illustrating a fingerprint ridge digital enhancement method according to an embodiment.
Figure 5:
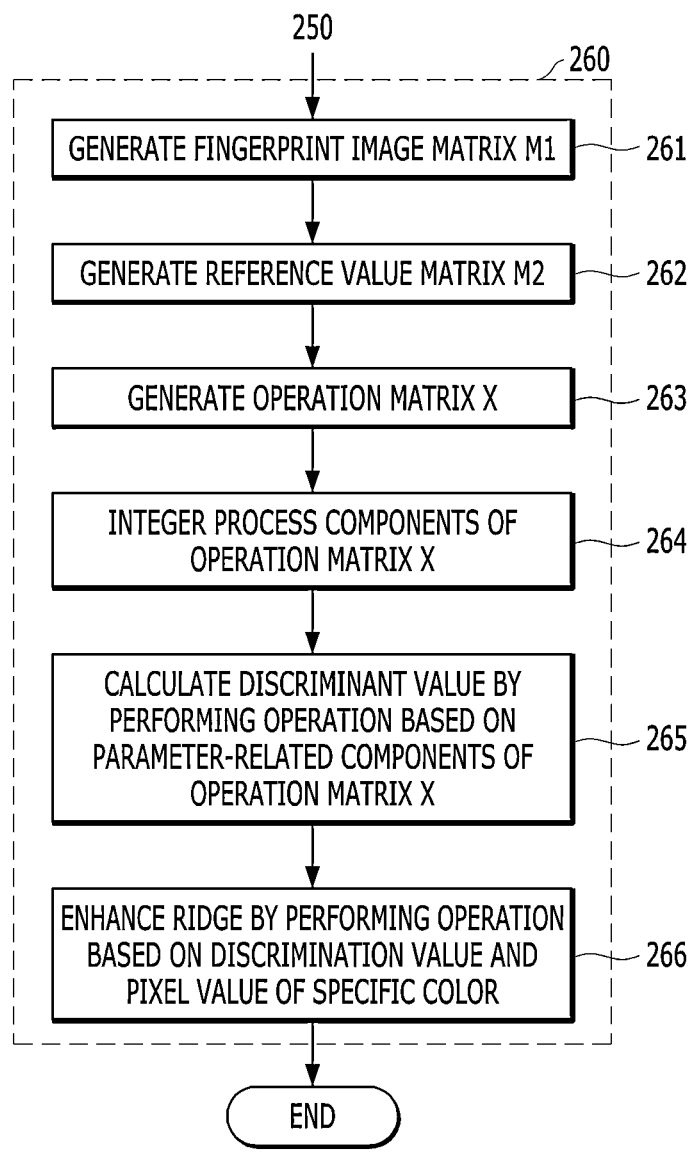

FIGS. 4 and 5 are flowcharts illustrating a fingerprint ridge digital enhancement method according to an embodiment. FIGS. 6 to 12 are views illustrating measurement results derived according to a fingerprint digital enhancement method according to an embodiment.

Operation 210 is obtaining a fingerprint image. Operation 210 may be performed by the fingerprint image obtainer 110.

As shown in FIG. 3, the fingerprint image may be divided into an area with ridges and an area without ridges.

Operation 220 is dividing an area with ridges and an area without ridges in the fingerprint image, and extracting a pixel value according to a color model for each area. Operation 220 may be performed by the pixel value extractor 120.

Figure 6:
FIG. 6 is a table showing pixel values of colors constituting an area with ridges in the fingerprint image of FIG. 3.
Figure 6:
Figure 6:
Figure 6:
Figure 6:
Figure 6:
Figure 6:
Figure 6:

FIG. 6 is a table showing pixel values of colors constituting an area with ridges in the fingerprint image of FIG. 3, and FIG. 7 is a table showing pixel values of colors constituting an area without ridges in the fingerprint image of FIG. 3.

Referring to FIGS. 6 and 7, R value, G value, B value, H value, S value, and V value according to RGB and HSV models of colors included in each area are shown.

Operation 230 is detecting an outlier of a pixel value according to a color model for each area. Operation 230 may be performed by the outlier detector 130.

For example, a Z-score may be calculated for a pixel value according to a color model for each area, and outlier detection may be performed based on a value of a certain range of the Z-score.

The Z-score is a value obtained by dividing a distance between a measured value and an average by a standard deviation of a population. The Z-Score represents a relative position of the measured value in the all population distribution. It can be expressed as Equation 1 below.

$$z = \frac{x - \mu}{\sigma} \qquad \text{[Equation 1]}$$

Where x is the measured value, p is the average, and a is the standard deviation.

FIG. 8 is a table for calculating Z-scores of the pixel values of FIG. 6, and FIG. 9 is a table for calculating Z-scores of the pixel values of FIG. 7.

In FIGS. 8 and 9, the Z-Score (z) is calculated for R value, G value, B value, H value, S value, and V value of each of colors included in an area with ridges and an area without ridges, and a value of z<−1 or z>1 is detected and displayed as an outlier. Each Z-Score (z) represents a relative position of each measured value in the entire population.

Operation 240 is calculating an average and a standard deviation of pixel values according to the color model for each area from which the outlier is removed. Operation 240 may be performed by the correction operator 140.

Figure 10:
FIG. 10 is a table showing averages and standard deviations calculated after removing outliers from the pixel values of FIG. 6.
Figure 10:
Figure 10:
Figure 10:
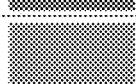
Figure 10:
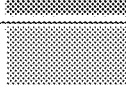
Figure 10:
Figure 10:
Figure 10:

FIG. 10 is a table showing averages and standard deviations calculated after removing outliers from the pixel values of FIG. 6, and FIG. 11 is a table showing averages and standard deviations calculated after removing outliers from the pixel values of FIG. 7.

Referring to FIGS. 10 and 11, a value of z<−1 or z>1 is detected as an outlier, and averages and standard deviations of pixel values within a range from which the outlier is removed are calculated.

In summary, in FIGS. 10 and 11, after removing the outliers, an average and standard deviation of R value, G value, B value, H value, S value, and V value of each color of areas with/without ridges are calculated and shown. The distribution of the R value, G value, B value, H value, S value, and V value of each color included in each area may be grasped.

Operation 250 is setting a parameter to be a criterion for dividing the areas (areas with/without ridges) and operating a reference value of the parameter. Operation 250 may be performed by the parameter operator 150.

For example, when color models applied to a fingerprint image are RGB and HSV models, a parameter may be set among individual color components R, G, B, H, S, and V, and a reference value may be operated with pixel values (R value, G value, B value, H value, S value, and V value) of the set parameter.

Referring to FIGS. 10 and 11, because an average difference between the R value and the H value of the area with ridges and the area without ridges is large, and the standard deviation of the R value and the H value in the area with ridges is small, the components R and H may be used as parameters for dividing the area with ridges and the area without ridges.

For example, as shown in FIG. 11, a reference value of a parameter may be operated according to the following Equation 2 based on a Z-Score (z') calculated by using the area without ridges after removing the outlier as a population.

REFERENCE VALUE OF PARAMETER=(z'×
STANDARD DEVIATION)+AVERAGE [Equation 2]

Where, based on z'=|±0.5|, a reference value of a parameter may be operated. For example, within the area without ridges, the R value and H value of an area corresponding to the distribution within −0.5<z'<0.5 (including values of about 38.2% of the population) may be greater than the reference value. In addition, the area with ridges corresponds to a case where both the R value and the H value are greater than or equal to the reference value.

Table 1 below is a table showing parameters set with reference to FIGS. 10 and 11 and reference values of the corresponding parameters.

TABLE 1

|  | Average of R value | Standard deviation of R value | Average of H value | Standard deviation of H value |
|---|---|---|---|---|
| Area with ridges | 245 | 14 | 171 | 2 |
| Area without ridges | 130 | 39 | 107 | 27 |
| Reference value of parameter | R value 149.5 | | H value 120.5 | |

Operation 260 is generating and operating a matrix including pixel values according to the color model of the fingerprint image and the reference values of the parameters. Operation 260 may be performed by the matrix operator 160.

In addition, operation 260 may include the following operations.

Operation 261 is generating a matrix M1 (fingerprint image matrix) including pixel values according to the color model of the fingerprint image.

For example, for the pixel values (R value, G value, B value, H value, S value, and V value) shown in the fingerprint image, the fingerprint image matrix M1=(R, G, B, H, S, V) may be generated.

Operation 262 is generating a matrix M2 (reference value matrix) including reference values of parameters.

For example, parameters set to divide the fingerprint image into an area with ridges and an area without ridges are components R and H of the color model, and respective reference values of the parameters may be referred to as a first reference value P1 and a second reference value P2. The reference value matrix M2=(P1, 1, 1, P2, 1, 1) including reference values of parameters may be generated.

Referring to Table 1, when P1=149.5 and P2=120.5, the reference value matrix M2 may be expressed as (149.5, 1, 1, 120.5, 1, 1).

At this time, operations 261 and 262 may be performed sequentially, may be performed in a different order, or may be performed simultaneously.

Operation 263 is generating an operation matrix X by performing operation based on the fingerprint image matrix M1 and the reference value matrix M2.

For example, for the fingerprint image matrix M1 and the reference value matrix M2, the operation matrix X may be generated by performing operation as in Equation 3 below.

$$X = M1(M2)^{-1} \quad \text{[Equation 3]}$$

It can be expressed as an operation matrix X=(R', G', B', H', S', V') derived here. At this time, because M1=(R, G, B, H, S, V) and M2=(P1, 1, 1, P2, 1, 1), R'=R/P1 and H'=H/P2. The R' and H' values may be changed to 1.XXX values when the R and H values are greater than a reference value, and may be changed to 0.XXX values when they are less than a reference value.

Operation 264 is integer processing components of the operation matrix X.

For example, among the components of the operation matrix X, components including decimal points may be expressed as integers by omitting decimal points. Among the components of the operation matrix X, the parameter-related R' value and the H' value may be changed to 1 or 0.

Operation 265 is calculating a discriminant value by performing operation based on parameter-related components of the operation matrix X.

For example, parameter-related components R' and H' may be extracted separately and a multiplication operation such as R'x H' may be performed. The R' and H' values are integer processed and may have a value of 1 or 0. Accordingly, a result of the multiplication operation is 1 if the R and H values of the fingerprint image matrix M1 are greater than or equal to the reference value, and 0 if they are less than the reference value.

In this way, the discrimination value according to the result of the operation may be 1 or 0. An area with a discrimination value of 1 indicates a ridge area, and an area with a discrimination value of 0 may indicate an area other than the ridge area.

Operation 266 is enhancing a ridge with a specific color by performing operation based on the discrimination value and a pixel value of the specific color.

For example, the area with a discrimination value of 1 may be represented by (255, 0, 0) representing red in an RGB model, and the area with a discrimination value of 0 may be represented by (255, 255, 255) representing white in the RGB model. Accordingly, the ridge area may be expressed in red, and the area other than the ridge area may be expressed in white.

Figure 12:
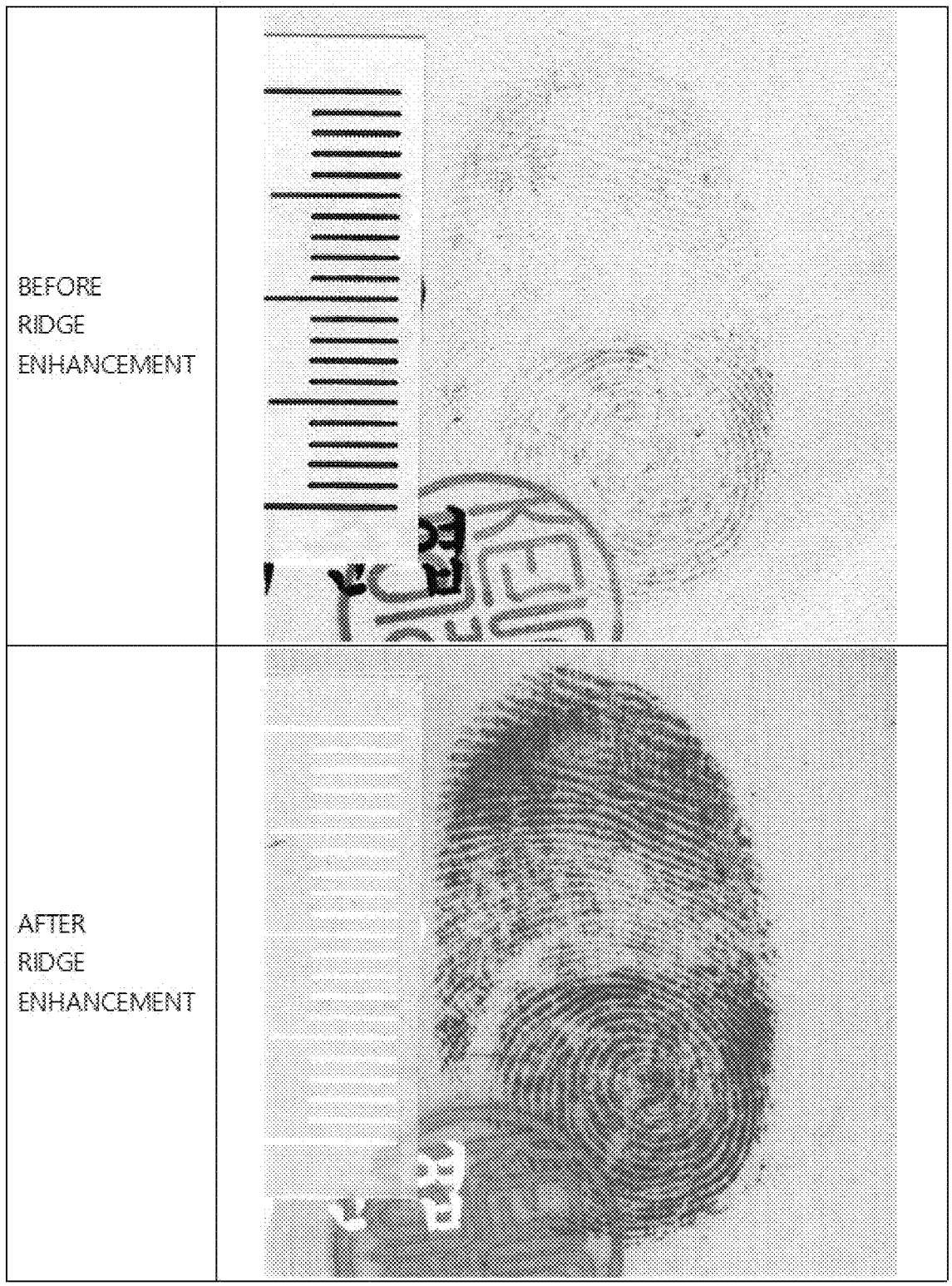
FIG. 12 is a view illustrating before and after digital enhancement of the fingerprint image of FIG. 3.

FIG. 12 is a view illustrating before and after digital enhancement of the fingerprint image of FIG. 3. After fingerprint image enhancement, a ridge area is expressed in red, and the area other than the ridge area is expressed in white. When comparing the fingerprint image before and after enhancement, the shape of the ridge after enhancement is expressed more clearly than before enhancement.

An apparatus and a method according to an embodiment may be implemented as program instructions that can be executed by one or more processors or by various computer devices, and recorded on a computer-readable recording medium. The computer-readable recording medium may include program instructions, data files, data structures or a combination thereof. Program instructions recorded on the medium may be particularly designed and structured for embodiments or available to one of ordinary skill in a field of computer software. Examples of the computer-readable recording medium include magnetic media, such as a hard disc, a floppy disc, and magnetic tape; optical media, such as a compact disc-read only memory (CD-ROM) and a digital versatile disc (DVD); magneto-optical media, such as floptical discs; and hardware devices that are specially configured to store and carry out program instructions (e.g., ROMs, random-access memories (RAMs), or flash memories). Program instructions may include, for example, high-level language code that can be executed by a computer using an interpreter, as well as machine language code made by a complier. The above hardware devices may be configured to operate as one or more software modules to perform the operations of the embodiments, and vice versa.

As described above, according to the fingerprint ridge digital enhancement apparatus 100 and the fingerprint ridge digital enhancement method 200 according to an embodiment, in a fingerprint image, a pixel value according to a color model may be extracted by dividing an area with ridges and an area without ridges, and digital enhancement of fingerprint ridges may be performed by setting parameters necessary for dividing areas according to the distribution the pixel value according to a color model.

In addition, one or more embodiments may contribute to appropriate resolution of criminal cases by more clearly expressing the shape of a ridge in a fingerprint image.

In addition, one or more embodiments may reduce processing time by performing matrix-based operations instead of pixel-based operations during fingerprint ridge enhancement operations.

Although the embodiments have been described with reference to the accompanying drawings, one of ordinary skill in the art will understand that various changes and modifications may be made therein. For example, the relevant results may be achieved even when the described technologies are performed in a different order than the described methods, and/or even when the described elements such as systems, structures, devices, and circuits are coupled or combined in a different form than the described methods or are replaced or substituted by other elements or equivalents.

In this regard, the present embodiments may have different forms and should not be construed as being limited to the descriptions set forth herein. While the disclosure has been particularly shown and described with reference to embodiments thereof, it will be understood that various changes in form and details may be made therein without departing from the spirit and scope of the following claims.

What is claimed is:

1. A fingerprint ridge digital enhancement apparatus comprising:
   a fingerprint image obtainer configured to obtain a fingerprint image;
   a pixel value extractor configured to divide an area with ridges and an area without ridges in the fingerprint image, and to extract a pixel value according to a color model for each area;
   an outlier detector configured to detect an outlier of the pixel value according to the color model for each area;
   a correction operator configured to calculate an average and standard deviation of pixel values according to the color model for each area from which the outlier is removed;
   a parameter operator configured to set a parameter that is a criterion for dividing each area, and to operate a reference value of the parameter; and a matrix operator configured to generate and operate a matrix including the pixel value according to the color model of the fingerprint image and the reference value of the parameter, wherein the generating and operating of the matrix comprises:

generating a matrix M1 (fingerprint image matrix) including the pixel value according to the color model of the fingerprint image;

generating a matrix M2 (reference value matrix) including the reference value of the parameter;

generating an operation matrix X by performing operation based on the fingerprint image matrix M1 and the reference value matrix M2;

integer processing a component of the operation matrix X;

calculating a discriminant value by performing operation based on parameter-related components of the operation matrix X; and enhancing a ridge of the fingerprint image with a specific color by performing operation based on the discrimination value and a pixel value of the specific color.

2. The fingerprint ridge digital enhancement apparatus of claim 1, wherein the color model comprises an RGB model and an HSV model.

3. The fingerprint ridge digital enhancement apparatus of claim 1, wherein the outlier detector calculates a Z-score of a pixel value according to the color model for each area, and determines and detects a Z-score of a certain range as an outlier.

4. A fingerprint ridge digital enhancement method comprising:

obtaining a fingerprint image;

dividing an area with ridges and an area without ridges in the fingerprint image, and extracting a pixel value according to a color model for each area;

detecting an outlier of the pixel value according to the color model for each area;

calculating an average and standard deviation of pixel values according to the color model for each area from which the outlier is removed;

setting a parameter that is a criterion for dividing each area, and operating a reference value of the parameter; and generating and operating a matrix including the pixel value according to the color model of the fingerprint image and the reference value of the parameter, wherein the generating and operating of the matrix comprises:

generating a matrix M1 (fingerprint image matrix) including the pixel value according to the color model of the fingerprint image;

generating a matrix M2 (reference value matrix) including the reference value of the parameter;

generating an operation matrix X by performing operation based on the fingerprint image matrix M1 and the reference value matrix M2;

integer processing a component of the operation matrix X;

calculating a discriminant value by performing operation based on parameter-related components of the operation matrix X; and enhancing a ridge of the fingerprint image with a specific color by performing operation based on the discrimination value and a pixel value of the specific color.

5. A computer program stored on a non-transitory computer-readable storage medium for executing the method of claim 4 using a computer.

* * * * *